Dec. 18, 1945.   C. MACKINTOSH   2,391,061
TIMBER CONNECTOR
Filed Jan. 4, 1943
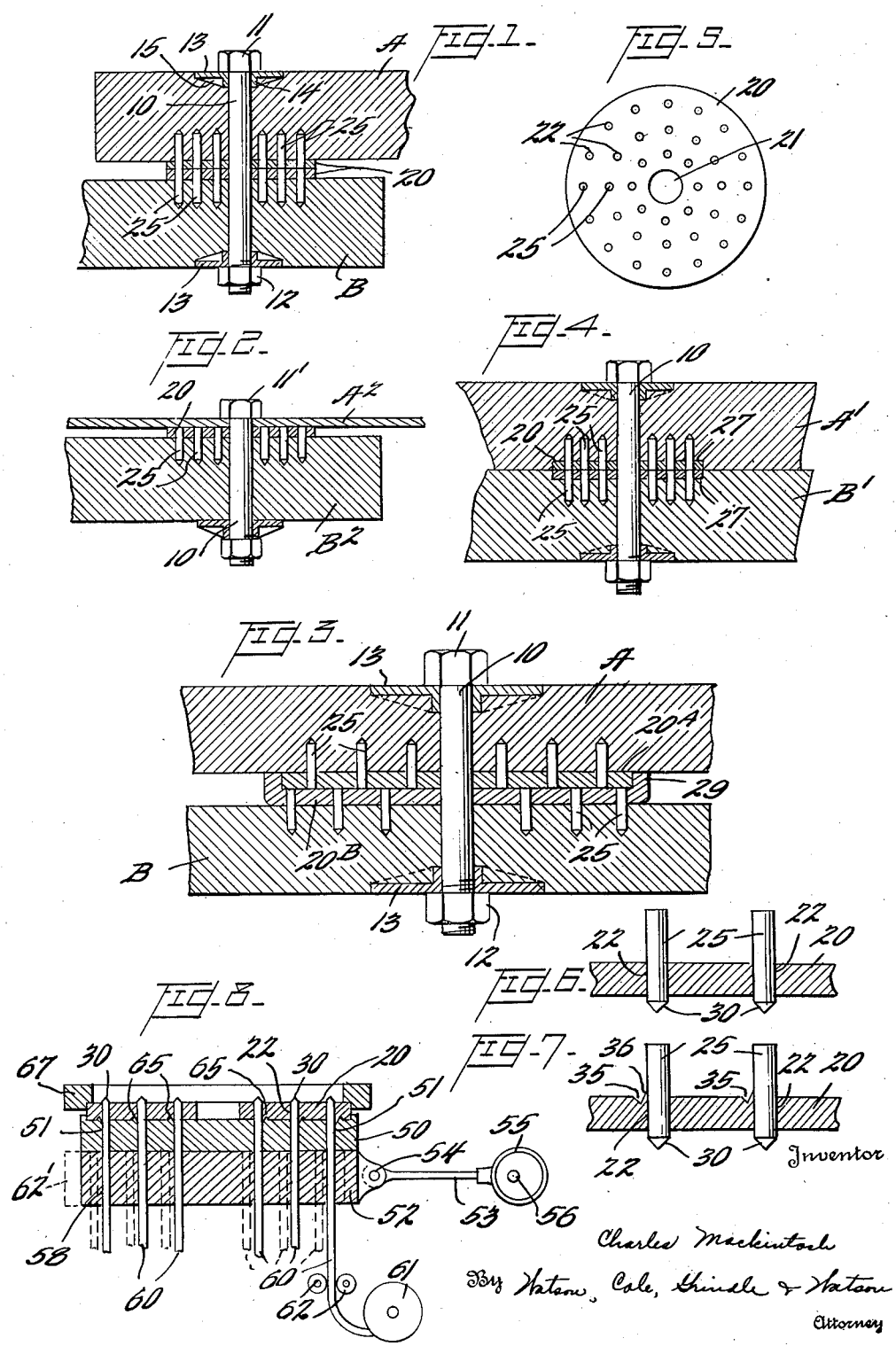
Charles Mackintosh
By Watson, Cole, Grindle & Watson
Attorney Patented Dec. 18, 1945

2,391,061

UNITED STATES PATENT OFFICE 2,391,061

TIMBER CONNECTOR

Charles Mackintosh, Los Angeles, Calif.

Application January 4, 1943, Serial No. 471,303

4 Claims. (Cl. 20—92)

This invention relates to fastening devices for use in building constructions and more particularly to timber connectors which are employed to secure wooden or other elements together in such constructions, such as, for example, trusses and other types of framing assemblies.

The general object of the invention is the provision of novel and improved connectors of this general class which are easy and economical to manufacture and install and are highly efficient in securing structural members together.

Many different kinds of connectors have heretofore been devised for use in association with bolted joints in wooden structures, and these have included split ring connectors, toothed or claw connectors, and various types of clamping plates including those having punched-out burrs or tongues for embedment in the wood of the connected members. In substantially all of these prior constructions, the entire connector member positioned between the connected timbers is embedded in the contacting faces of the timbers and this requires special processing either on the job or at some prefabricating point.

It is a more specific object of the present invention to provide a timber connector of the bolt and plate type which does not require any special tools to install and is adapted to sustain a greater load with less area of plate or washer member. Furthermore, since the present connector embodies a plate member which is not embedded in the timber, these connectors do not require as wide spacings between units, or between any unit and the end of the timber, as in prior devices. Also, in the preferred form of the invention, no reduction of cross-sectional area of the timber is required, as for the embedment of the plate or washer; and in this form of the invention the dangerous omission of a plate or washer element at any point may be readily detected visually. This is a distinct improvement over the prior art, especially in the matter of official inspection of building structures of the general type to which the invention is applied. Frequently workmen have failed to install the washer or plate elements of a connector and this omission is not readily apparent when the elements are supposed to be embedded in the timbers within the interior of the joint. It has occasionally become necessary for inspectors to employ expensive portable X-ray equipment to examine certain wooden structures in order to determine whether or not the interior connector plates are in place.

The invention, in its preferred embodiments, contemplates the provision of a pair of metal washers or plates provided with central openings for the passage of a bolt, and a multiplicity of smaller holes therethrough, having short nails, spikes or pegs tightly inserted therein. These pegs are driven through the holes in the plates at the time of manufacture of the connector, so that the points project to some extent on the side to be applied to the structural member with which the connector is used.

In installing the connector the timbers which are to be joined are drilled to receive the bolt, if they have not been previously prepared, and the spiked washers are applied to the mutually adjacent faces of the timbers with the respective bolt holes in registry. Then all the spikes or pegs carried by the washers are driven firmly home. Finally the timbers are brought together with the washers in abutting relationship and the bolts applied and tightened.

The washers or plates may be of polygonal or circular contour and the pegs, which are similar to headless wire nails, are pointed and sized and shaped to effect a firm connection without causing the timber to split under load.

The invention also contemplates the provision of a novel method and suitable apparatus for making the connectors.

Other objects and features of novelty will be apparent from the following specification when read in connection with the accompanying drawing in which certain embodiments of the invention are illustrated by way of example.

In the drawing,

Figure 1 is a fragmentary transverse sectional view of a timber joint with a connector embodying the principles of the invention applied thereto;

Figure 2 is a similar view showing an adaptation of the invention to a joint between a wooden and a metal structural element;

Figure 3 is a similar view of a joint in which a modified form of connector is used;

Figure 4 is a similar view of a joint employing a connector such as shown in Figure 1, but in which the intermediate washers or plates are embedded in the timbers in accordance with conventional practice;

Figure 5 is a plan view of one of the washer or plate elements of the connector showing one arrangement of the numerous spikes or pegs passing through the plate;

Figure 6 is a fragmentary vertical sectional view of a portion of one of the washers or plates showing the pegs or spikes applied with a driving fit, ready for application to a wooden element;

Figure 7 is a similar view of a modified form of connector showing the pegs or spikes secured within the openings in the washer by distortion of the metal around said openings; and Figure 8 is a somewhat diagrammatic vertical sectional view of a machine for making the spiked connector plates or washers.

In the embodiment of the invention illustrated in Figure 1 of the drawing, the overlapping ends of two timber structural elements which are joined by the connector are designated A and B. Each of these elements is bored for the reception of the transversely extending bolt 10, the bolt being provided with a head 11 and a nut 12 threaded upon one of its shanks. In all such constructions external washer members are provided which may be of any suitable type. In the present illustrated embodiment the outer washers designated at 13 are in the form of circular discs having an annular boss 14 surrounding the bolt and inclined ribs 15 extending radially from the boss 14. The boss and the ribs may be embedded within the exterior surfaces of the structural elements so as to prevent rotation of the washer, or they may be disposed outwardly of the assembly as shown in Figure 2. Within the scope of the invention, however, except as may be covered in the subjoined claims, any type of exterior washer may be employed.

Between the structural elements A and B and lying flat against their respective mutually facing surfaces are the connector plates or washers 20. These plates may be of any suitable marginal shape whether polygonal, oval, or circular, but for illustrative example, a circular plate is shown in plan in Figure 5 of the drawing. The plate is provided with a circular central opening 21 which registers with the bolt openings in the timbers and is of course adapted to permit the passage of the shank of the bolt through the plate. Substantially the entire surface of the plate or washer 20 is provided with a large number of holes 22, as clearly indicated in Figure 5. Each of these holes is adapted to snugly receive a headless nail, spike, or peg 25 which is firmly seated within the opening and is driven into the adjacent timber A or B.

The outer faces of each of the plates or washers 20 away from the respective timbers A and B are in contact and both washers are easily visible within the space between the timbers, that is, in the preferred embodiments of the invention. In Figure 4, however, a connector assembly consisting of the same elements as described in connection with Figure 1 is shown in which the plates are embedded within recesses 27 formed in the adjacent faces of the timbers A' and B' so that these faces may come into close contact with each other. For some purposes this arrangement may be found desirable.

In Figure 2 of the drawing a metal strap or other structural element A² is joined to a timber member B² by means of a slightly modified connector assembly which employs a shorter bolt 10' the head end 11' of which secures the metal member A² against the outer face of the single washer or plate 20 employed. The spikes or pegs 25 of this member enter the timber B² in the usual way.

Another modification of the invention is shown in Figure 3 of the drawing in which a timber A is joined to a similar member B by means of a connector assembly which includes the bolt 10, the outer washers 13 and the inner washers or plates 20A and 20B. The plate 20B is provided with peripheral flanges 29 which enclose the margins of the complementary plate 20A and provide an interlocking structure which may sustain great shearing stresses and permits the utilization of a bolt of smaller size. Both of the plates 20A and 20B are provided with the novel spikes or pegs 25.

One of the important features of the invention, to which brief reference has already been made, resides in the fact that no special tools or preparatory operations on the timbers are necessary in applying the connectors in the field. All that a workman needs in order to install the connectors is a hammer for driving the pegs and a wrench for tightening the bolt and nut. In order that the pegs 25 may be preliminarily secured to the plates for convenience in shipping and applying the units, they are inserted in the openings 22 of the plates with a driving fit as shown in Figure 6 of the drawing, the pointed ends 30 of the pegs or spikes projecting to a slight extent upon the side of the plate which lies against its adjacent timber. Then, when the plates are applied to the face of the timber the pegs 25 are driven home so that the blunt ends are flush with the outer surface of the plate as shown in the earlier figures of drawing.

One way of setting the pegs in their preliminary position for shipment is illustrated in Figures 7 and 8 of the drawing. In Figure 7 the plate 20 is shown as provided with the usual openings 22 which may or may not be of a diameter to afford a driving fit to the pegs 25. In order to insure retention of the pegs in their preliminary positions as shown, the outer surface of the plate 20 is prick-punched as shown at 35, the metal of the surface of the plate being caused to flow radially from the center of the punched indentation. A portion of this flowing metal as indicated at 36 presses against the wall of the adjacent peg 35 and serves to clinch it in the opening.

In Figure 8 of the drawing, an apparatus for accomplishing the setting of the pins as just described and as illustrated in Figure 7 is diagrammatically shown. A base block 50 is provided with a series of holes 51 corresponding in position and number to the holes 22 in the connector plate 20. Another block or plate 52 is arranged immediately below the base block 50 and is mounted for horizontal reciprocation which may be effected by any suitable mechanism such as the pitman 53 pivoted as at 54 to the movable block and driven by the eccentric and strap connection indicated at 55 and carried by the shaft 56. This movable block 52 is provided with a series of openings 58 corresponding to the openings 51 in the base block. A number of strands of wire nail stock or similar elongated material indicated at 60 in the drawing, are fed from spools or coils such as suggested at 61 in Figure 8, or from any other suitable source and are fed through the openings 58 in the block 52 and the openings 51 in the base block 50 by any suitable feeding device which may include feed rollers suggested at 62. The upper ends of the wire stock are projected above the upper surface of the block 50 sufficiently to pass through the openings 22 in a connector plate 20 when the latter is applied to the block 50. The thickness of the block 50 is equal to the desired projecting length of the pegs 25 upon the outer sides of the plates as shown in Figures 6 and 7 of the drawing. The upper surface of the block is provided with pointed punch projections 65, each adjacent one of the openings 51 of the block. When the wire stock has all been projected the proper distance, a plate 20 is applied to the upper surface of the block 50 with the projecting portions of the wires passing through the holes 22. The plate 20 is then hammered or firmly pressed down upon the face of the block 50, as for example by means of the presser ring 67, and the punch points 65 serve to prick the surface of the plate 20 adjacent the openings 22 and firmly anchor the wires within these openings. Then the shear block 52 is moved to the dotted line position indicated at 52', thus cutting off the wires at the proper points in order to provide the pegs or spikes 25. The pegs may be pointed as at 30 by any suitable means either before or after shearing them, and finally the plates 20 with a full complement of pegs 25 secured therein may be removed from the base block 50, and another feed of wire stock effected for the manufacture of another connector.

Various changes and modifications may be made in the embodiments illustrated and described herein without departing from the scope of the invention as defined by the following claims.

Having thus described the invention, what is claimed as new and desired to be secured by Letters Patent is:

1. As an article of manufacture, a timber connector element comprising, in combination, a metal plate having a plane timber contacting surface and a multiplicity of holes extending transversely therethrough, a multiplicity of pegs having their forwarding or entering ends only securely set in said holes, said pegs adapted to be driven home into the adjacent face of a timber when the connector is applied to a timber joint.

2. As an article of manufacture, a timber connector element comprising, in combination, a metal plate having a plane timber contacting surface and a multiplicity of small holes extending transversely therethrough, a multiplicity of pointed pegs having their pointed ends frictionally secured within said holes, said pegs adapted to be driven home into the adjacent face of a timber when the connector is applied to a timber joint.

3. As an article of manufacture, a timber connector element comprising, in combination, a metal plate having a plane timber contacting surface and a multiplicity of small holes extending transversely therethrough, a multiplicity of pegs having their forwarding or entering ends only securely set in said holes by a distortion of the metal of the plate adjacent said holes, said pegs adapted to be driven home into the adjacent face of a timber when the connector is applied to a timber joint.

4. As an article of manufacture, a timber connector element comprising, in combination, a metal plate having a plane timber contacting surface and a multiplicity of holes extending transversely therethrough, a multiplicity of pegs securely set in said holes, the surface of said plate adjacent each of said holes being prick-punched to cause some of the metal to flow toward the hole to firmly grip the peg therein, said pegs adapted to be driven home into the adjacent face of a timber when the connector is applied to a timber joint.

CHARLES MACKINTOSH.